Sept. 4, 1928.
G. A. TRAUGER
1,683,000
REMOTE CONTROL FOR TRACTORS
Filed Sept. 30, 1926
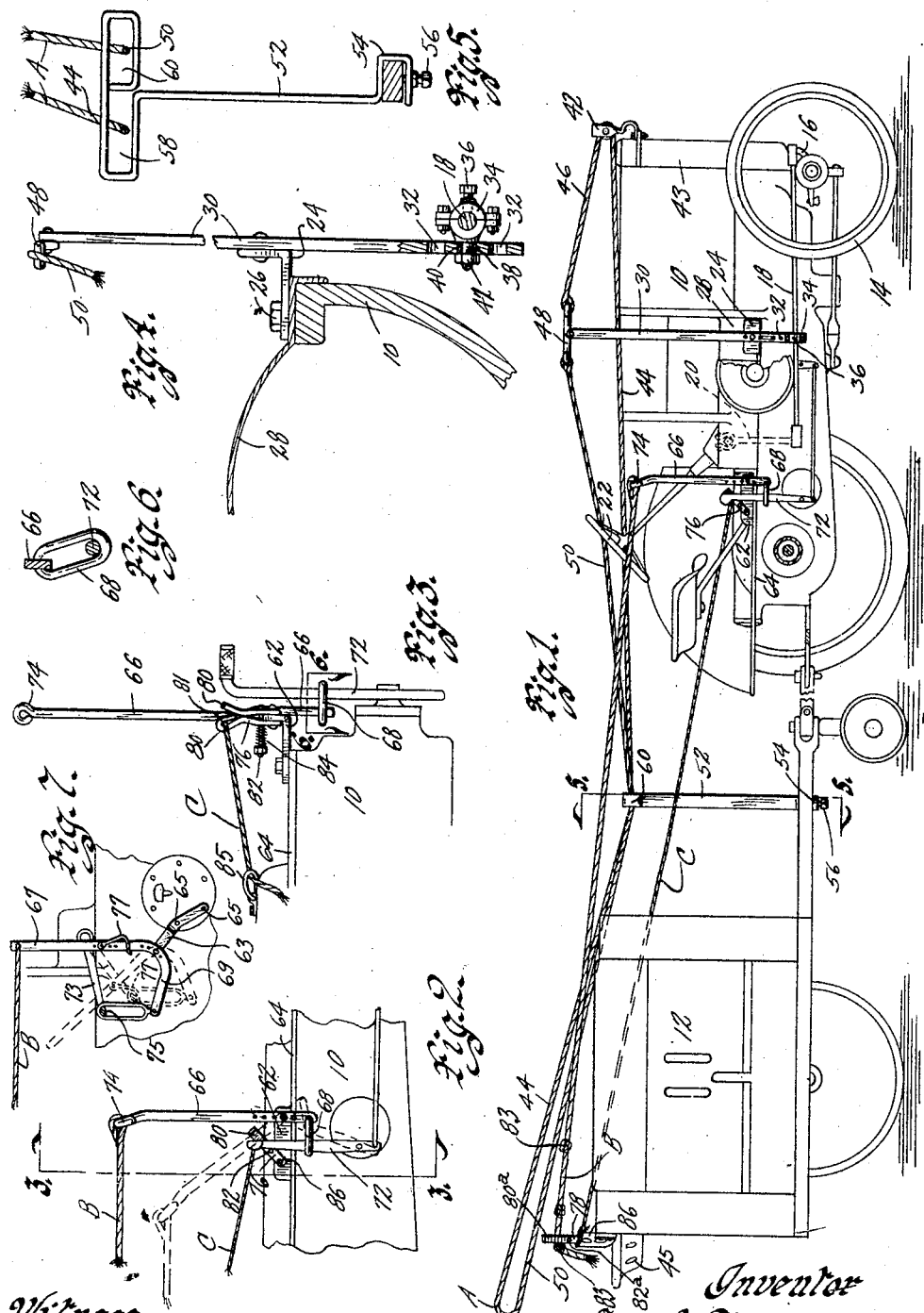
Inventor
Guy A. Trauger
by Bair & Freeman Attorneys
Witness
Ray Kusher Patented Sept. 4, 1928.

1,683,000

UNITED STATES PATENT OFFICE.

GUY A. TRAUGER, OF LIVERMORE, IOWA.

REMOTE CONTROL FOR TRACTORS.

Application filed September 30, 1926. Serial No. 138,805.

The object of my invention is to provide a remote control for tractors of simple, durable and comparatively inexpensive construction.

A further object is to provide means for controlling the steering mechanism of a tractor having a drag link along the side thereof by designing the steering control so that its actuation causes longitudinal movement of the drag link.

Still a further object is to provide novel and efficient means for connecting the steering control to the tractor and the drag link.

Still a further object is to provide a device whereby a lever for steering the tractor can be controlled by ropes similar to driving a team of horses.

Still a further object is to provide a clutch control for depressing the clutch pedal of the tractor and means for maintaining the clutch pedal depressed.

Still a further object is to provide novel means for operatively connecting the clutch control to the clutch pedal and means for locking the clutch control.

Still a further object is to provide ropes for actuating the controls from a distance and guide members for supporting the steering rope.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1, is a side elevation illustrating a tractor and a binder attached thereto with my remote control in working position thereon.

Figure 2, is an enlarged view of the clutch control and illustrating it in two positions, one position being dotted.

Figure 3, is a detail sectional view on the line 3—3 of Figure 2.

Figure 4, is a detail sectional view on the line 4—4 of Figure 1.

Figure 5, is a front elevation of a line support taken on the line 5—5 of Figure 1.

Figure 6 is an enlarged detail sectional view taken on the line 6—6 of Figure 3; and Figure 7 is a side elevation of my clutch control modified to fit a different tractor.

On the accompanying drawings I have used the reference numeral 10 to indicate generally a tractor and 12 to indicate generally a binder.

The front wheels 14 of the tractor 10 are steerably linked together in the usual well-known manner and one of the spindles of the front wheels has an arm 16 for steering the wheels.

The arm 16 is connected by a drag link 18 to an arm 20 actuated by the steering wheel 22 of the tractor.

In applying my steering mechanism to the tractor 10 I remove the arm 20 so that movement of the drag link 18 is not hindered by the steering gears actuated by the wheel 22.

The steering mechanism of my remote control comprises a bracket 24 bolted to the crank case by the bolts 26 which normally secure the fly wheel cover 28 in position. To the bracket 24 I pivotally secure a steering lever 30.

The lever 30 is provided with a series of openings 32 at its lower end. For operatively connecting the lever 30 to the drag link 18 I provide a two part clamp member 34 for encircling the link 18. A set screw 36 serves as an additional means for preventing longitudinal movement of the clamp member 34 relative to the link 18.

The clamp member has a spindle 38 projecting therefrom and designed to selectively enter the openings 32 for adjusting the steering action of the front wheels 14 in any desired proportion to the swinging movement of the lever 30.

To allow free pivotal movement of the clamp member 34 relative to the lever 30, a bushing 40, slightly longer than the thickness of the lever, is positioned on the spindle 38 between the nut 41 and the clamp member.

From the foregoing it will be seen that swinging movement of the lever 30 will impart longitudinal movement of the drag link 18 for steering the wheels 14 of the tractor without interference from the steering gears because of the removal of the arm 20.

For utilizing a rope A to swing the lever 30 and arranging the rope so that it can be used similar to the lines when driving a team of horses, I provide a pulley 42, secured to the radiator 43 of the tractor 10. The rope A extends as at 44 from the operator, who occupies the seat 45 of the binder, over the pulley 42 and back as at 46 to a link 48 pivoted to the lever 30.

The rope A then extends from the link 48 back to the operator as at 50.

For supporting the steering rope A, I provide a member 52 having a clamp portion 54 adapted to be clamped to the tractor platform, draw bar or binder tongue as desired by the set screw 56.

The supporting member 52 has loops 58 and 60 through which the portions 44 and 50 of the rope A extend. Any desired number of these supports may be used.

The clutch control mechanism of my remote control structure comprises a bracket 62 bolted on the platform 64 of the tractor 10. A clutch lever 66 is pivoted to the bracket 62 and a loop 68, similar to the link of a chain, extends through an opening in the lever 66 and around the clutch pedal 72.

For actuating the clutch lever 66 I provide a clutch rope B extending from an eye 74 in the lever 66 to the operator.

From the foregoing it will be seen that the pulling of the rope B by the operator will pull the clutch pedal 72 forward for disengaging the clutch of the tractor 10.

For maintaining the clutch disengaged, I provide similar friction holding members 76 and 78. These members comprise bars having their upper ends 80 and 80$^a$ bent away from each other as clearly shown in Figure 3 of the drawings. The members have bolts 82 and 82$^a$ extending through them and springs 84 and 84$^a$ are provided on the bolts 82 and 82$^a$ for resiliently holding the bars together.

The holding member 76 is secured to the bracket 62 by a rivet 86 extending loosely therethrough and the holding member 78 is designed to be received in the whip socket 86 on the binder 12.

The member 78 is designed to hold the rope B by forcing the rope between the two bars comprising the member and the member 76 is designed to receive the clutch lever 66 in a similar manner. The member 76 differs from the member 78 by having an inturned end 81 back of which the lever 66 is held by the spring 84. A rope C is secured to one side of the member 76 and extends through a ring 85 which is spaced sidewise relative to the holding member 76. The rope C then extends back to the operator. When it is desired to release the lever 66, a pull on the rope C will open the holding member 76.

The member 78 serves to hold the rope B taut when the clutch is engaged. Knots 83 may be tied in the rope B to coact with the back edge of the holding member.

The member 76 serves as a positive holding means when the clutch is disengaged and is used when the tractor is controlled without a trailing device to support the member 78. When a clutch pedal 73 illustrated in Figure 7 is to be controlled by my clutch control, it is merely necessary to provide the lever 67 with a bent portion 69. I also provide a slightly different bracket 63 attached to bolts 65 found on the tractor.

Instead of the holding member 76, a hook 77 can be used and this hook swings under the pedal portion 75 of the clutch pedal 73 due to its inertia. When the lever 67 is swung backwards to release the hook 77, the lever 67 is pulled further backwards and the hook swings from beneath the pedal portion 75 due to its weight.

It will thus be seen that I have provided a remote control for tractors whereby the steering, starting and stopping of the tractor is accomplished by the manipulation of ropes and that my device can easily and conveniently be attached to a tractor. The levers 30, 66, and 67 are each provided with a series of holes for changing their leverages or adjusting them to different tractors. By disconnecting the lever 20, objectionable spinning of the steering wheel 22 is overcome. By connecting my steering control to the drag link 18, I eliminate lost motion of the steering wheel 22 and the other elements of the steering gears.

By refering to Figure 1, it will be seen that the rope A extends through the spokes of the steering wheel which serves as a convenient line support.

Some changes may be made in the construction and arrangement of the various parts of my invention, without departing from the real spirit and purpose of my invention, and it is my intention to cover by my claims any modified forms of structure or use of mechanical equivalents, which may be reasonably included within their scope.

I claim as my invention:

1. In combination with a tractor having steering mechanism including a drag link and a steering arm for operating the same, a remote control device comprising a bracket mounted on the tractor, a steering lever pivoted thereto, a clamp member comprising two semi-circular members having ears, clamping bolts through said ears for clamping said clamp member on said drag link, one of said semi-circular members having an extension pivoted to said steering lever a pulley mounted on said tractor and a steering rope extending from said steering lever to the operator and back through said pulley back to the steering lever.

2. In combination with a tractor having steering mechanism including a drag link and a steering arm for operating the same, a remote control device comprising a bracket mounted on the tractor, a steering lever pivoted thereto, a clamp member secured to said drag link and pivoted to said steering lever, a pulley mounted on said tractor, a guide member comprising a clamp, an upwardly extending portion and a pair of loops at the top thereof, a steering rope extending from said lever through one of the loops of said guide and to the operator and back through the other loop and through said pulley to the lever.

Des Moines, Iowa, September 7, 1926.

GUY A. TRAUGER.